United States Patent
Liu et al.

(10) Patent No.: US 7,564,895 B2
(45) Date of Patent: Jul. 21, 2009

(54) METHOD AND APPARATUS FOR MONITORING CHANNEL FREQUENCY RESPONSE

(75) Inventors: Gin Liu, Brampton (CA); Andrew Dempster, Norcross, GA (US); Mike M. J. Wingrove, Kanata (CA); Gwendolyn Kate Harris, Ottawa (CA); Michel M. Darveau, Aylmer (CA); Leslie Humphrey, Harlow (GB); Mohammed Reza Pakravan, Shariaty (IR)

(73) Assignee: Nortel Networks Limited, Montreal, Quebec (CA)

( * ) Notice: Subject to any disclaimer, the term of this patent is extended or adjusted under 35 U.S.C. 154(b) by 781 days.

(21) Appl. No.: 10/024,020

(22) Filed: Dec. 21, 2001

(65) Prior Publication Data

US 2002/0176544 A1    Nov. 28, 2002

Related U.S. Application Data

(60) Provisional application No. 60/279,924, filed on Mar. 29, 2001.

(51) Int. Cl.
    *H04B 1/38* (2006.01)
    *H04L 5/16* (2006.01)
(52) U.S. Cl. .................. 375/221; 375/220; 375/222; 375/226; 375/227
(58) Field of Classification Search .......... 375/222, 375/260, 259, 219, 221, 224, 261, 231, 316, 375/220; 370/480, 485, 493, 252, 203, 211, 370/484; 379/22, 22.08
See application file for complete search history.

(56) References Cited

U.S. PATENT DOCUMENTS

| | | | | |
|---|---|---|---|---|
| 5,487,069 A * | 1/1996 | O'Sullivan et al. | ........... | 370/404 |
| 6,044,403 A * | 3/2000 | Gerszberg et al. | ........... | 709/225 |
| 6,130,882 A * | 10/2000 | Levin | ........... | 370/252 |
| 6,192,109 B1 * | 2/2001 | Amrany et al. | ........... | 379/30 |
| 6,219,378 B1 * | 4/2001 | Wu | ........... | 375/231 |
| 6,263,077 B1 * | 7/2001 | Zuranski et al. | ........... | 379/406.08 |
| 6,373,860 B1 * | 4/2002 | O'Toole et al. | ........... | 370/493 |
| 6,459,678 B1 * | 10/2002 | Herzberg | ........... | 370/203 |
| 6,628,754 B1 * | 9/2003 | Murphy et al. | ........... | 379/1.03 |
| 6,721,394 B1 * | 4/2004 | Murphy et al. | ........... | 379/22.08 |
| 6,724,849 B1 * | 4/2004 | Long et al. | ........... | 375/371 |
| 7,242,761 B1 * | 7/2007 | Milbrandt | ........... | 379/399.01 |
| 2002/0021787 A1 * | 2/2002 | Chea, Jr. | ........... | 379/29.01 |
| 2002/0080867 A1 * | 6/2002 | Abbas et al. | ........... | 375/222 |
| 2002/0131371 A1 * | 9/2002 | Rudnick | ........... | 370/252 |
| 2003/0011489 A1 * | 1/2003 | Viswanathan | ........... | 340/853.1 |
| 2004/0081233 A1 * | 4/2004 | Bremer et al. | ........... | 375/222 |
| 2004/0105465 A1 * | 6/2004 | Gross et al. | ........... | 370/480 |
| 2005/0041753 A1 * | 2/2005 | Cunningham | ........... | 375/285 |

* cited by examiner

*Primary Examiner*—Chieh M Fan
*Assistant Examiner*—Qutbuddin Ghulamali

(57) ABSTRACT

Method and apparatus for retrieving the channel frequency response H(f), the noise N(f), measured at initialization and the signal to noise ratio SNR(f) measured at show time on a per bin basis, in the upstream or downstream direction. Initialization H(f) is used for analyzing the physical copper loop condition between tip and ring. Initialization N(f) is used for analyzing the crosstalk. Showtime SNR(f) is used for analyzing time dependent changes in crosstalk levels and line attenuation. The combination of H(f), N(f) and SNR(f) allows analysis of the line conditions for reaching the maximum data rate of a given loop, scheduling maintenance and plant update.

26 Claims, 1 Drawing Sheet

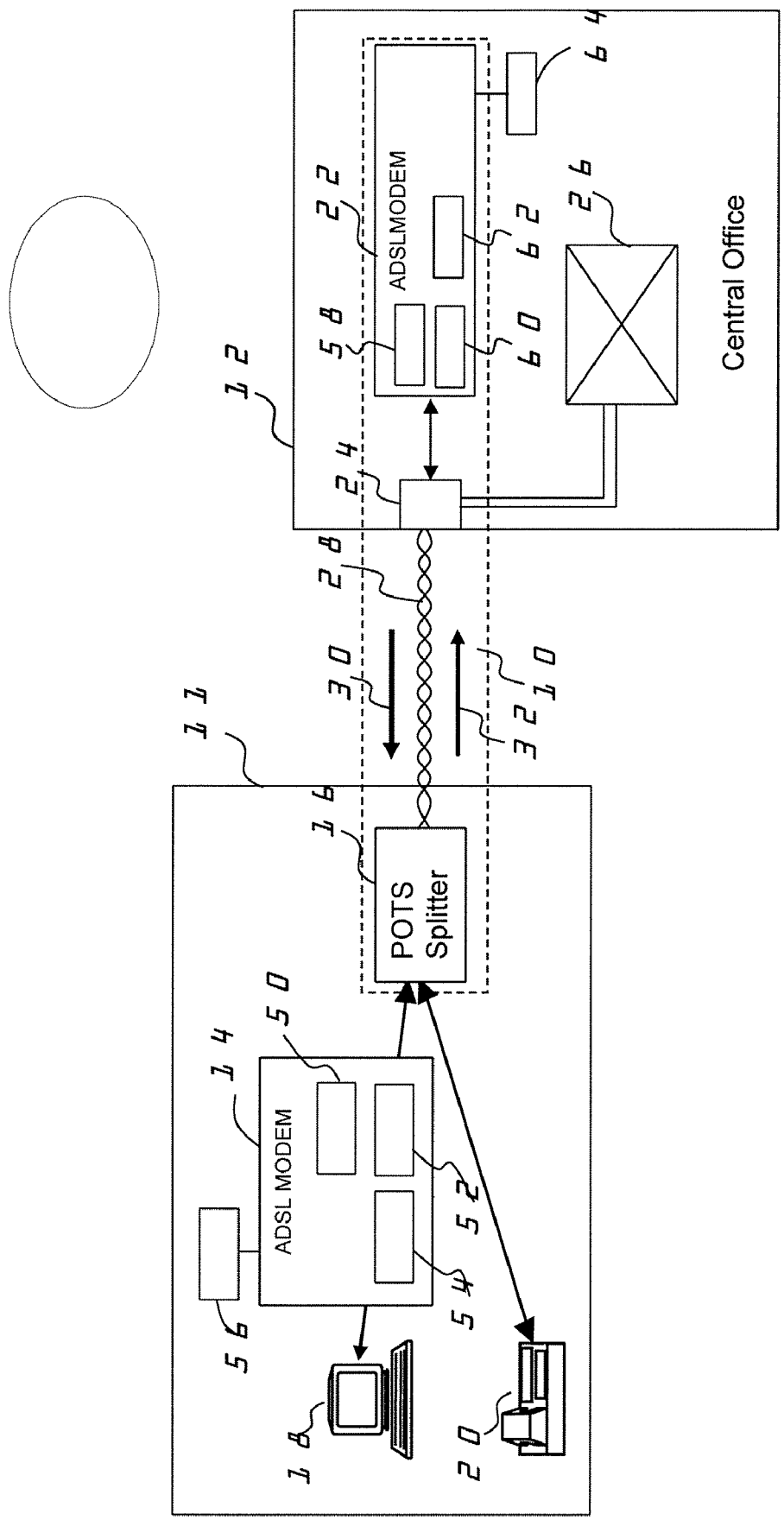
Figure

METHOD AND APPARATUS FOR MONITORING CHANNEL FREQUENCY RESPONSE

FIELD OF THE INVENTION

The present invention relates to a method and apparatus for determining, storing and retrieving channel frequency characteristics for discrete multi-tone (DMT) and is particularly concerned with asymmetric digital subscriber lines (ADSL) and very high bit-rate digital subscriber lines (VDSL) using DMT modulation.

BACKGROUND OF THE INVENTION

Digital Subscriber Line (DSL) is a well known access technology that uses existing 2-wire copper telephone wiring (also known as unshielded twisted pair UTP) to deliver high-speed data services to homes and businesses. DSL technology has become popular with both subscribers and Internet service providers because the service uses the customer's existing phone line and typically does not require an additional phone line. In addition, the signaling used by some DSL technology is above that used by plain old telephone service (POTS). Hence, this allows an "always-on" Internet access while still providing use of the phone line. Current ADSL technology offers users a choice of speeds up to about 8 Mbps. This is much faster than a standard 56 Kbps dial-up modem.

There are many types of DSL, generically these have come to be known by the designation xDSL. For any given line, for a particular type of xDSL, the maximum xDSL speed is limited by the frequency response of the channel which is a function of the distance between the subscriber and the central office (CO) and the filtering placed on the line, and by the noise conditions on the line which are primarily a function of crosstalk from other signals in the cable and ingress from AM radio transmitters. On long loops speed frequency response and noise conditions of the channel bound the upper rate. On shorter loops the xDSL technology and its allocated bandwidth may be bit rate determining factor.

Asymmetric Digital Subscriber Line (ADSL) is one of the xDSL technologies that provide more bandwidth in one direction than the other, typically downstream from the central office to the subscriber. Very high bit-rate Digital Subscriber Line (VDSL) is a particular type DSL that may be configured as an asymmetric or a symmetric serive. It delivers from 13 to 52 megabits per second downstream bandwidth and 1.5 to 13 megabits per second upstream. VDSL may be implemented using single carrier or DMT based modulation. ADSL uses a form of modulation known as discrete multi-tone modulation (DMT). DMT is method of modulation that divides the available frequency range into sub-channels or tones, the number of sub-channels depends on the particular implementation.

ITU-T Recommendation G.992.1 also known as G.dmt, is a form of ADSL technology, using DMT modulation, that offers up to 8 MBPS downstream bandwidth, 1.544 MBPS upstream bandwidth. ITU-T Recommendation G.992.2 is also known as G.lite, is a form of ADSL technology, using DMT modulation, that offers up to 1.5 MBPS downstream bandwidth, 384 KBPS upstream. The rates mentioned above are not caps on the achievable data rate in these technologies but reflect rates discussed in the ITU standards documents.

The deployment of xDSL services in the copper loops helped service providers in providing new services and creating new revenues. However, the introduction of these services also created new challenges to the service providers in the maintenance and diagnostics area. Traditional methods of determining that a twisted pair is suitable for POTs service are not adequate for these higher frequency services. The rate determining factors of channel frequency response and noise can change over time, and require monitoring to ensure adequate service. These challenges include how to provide effective and low cost maintenance operation for the new services.

SUMMARY OF THE INVENTION

An object of the present invention is to provide an improved method and apparatus for determining, storing and retrieving channel characteristics for discrete multi-tone.

Accordingly, the present invention provides method and apparatus for retrieving channel characteristics measured at a CO end of the channel by a CPE end of the channel. If the channel characteristics is determined at the CPE end and retrieved at the CO end, the first end of the channel means the CPE end and the second end of the channel means the CO end. However, if the channel characteristics is determined at the CO end and retrieved at the CPE end, the first end of the channel means the CO end and the second end of the channel means the CPE end.

To assist the ADSL service providers to meet the challenges discussed above, an embodiment of the present invention adds a physical layer protocol to retrieve the in-band downstream ADSL channel frequency response $H(f)$, the noise $N(f)$, measured at initialization and the signal to noise ratio $SNR(f)$ measured at show time on a per bin basis.

An embodiment of the present invention also provides for retrieval of similar in-band information in the upstream direction.

Conveniently, an embodiment of the present invention adds the following parameters to G.992.1 bis and G.992.2 bis.

(a) The definition of the message protocol for retrieving during show time the following ATU-R information on a per bin basis:
   i. In-band channel frequency response per bin $H_R(f)$ measured during the initialization referred back to the receiver tip and ring copper pair by the ARU-R.
   ii. In-band noise estimation per bin $N_R(f)$ during the initialization referred back to the remote tip and ring copper pair by the ATU-R.
   iii. The show time signal-to-noise ratio per bin $SNR_R(f)$. The values of $SNR_R(f)$ should be updated as they change.

(b) The addition of the programming interface in the ADSL ATU-C chipset level to make similar information available for the upstream direction, that is $N_c(f)$, $N_c(f)$ and $SNR_C(f)$. The conditions of them must be the same as the above.

(c) $H(f)$, $N(f)$ and $SNR(f)$ are proposed as mandatory parameters.

The purposes of making the above information available are:

a) Initialization $H(f)$ can be used for analyzing the physical copper loop condition between tip and ring.

b) Initialization $N(f)$ can be used for analyzing the crosstalk.

c) Showtime $SNR(f)$ can be used for analyzing time dependent changes in crosstalk levels and line attenuation (such as due to moisture).

d) The combination of H(f), N(f) and SNR(f) can be used for trouble shooting why the data rate cannot reach the maximum data rate of a given loop, scheduling maintenance and plant upgrade.

The invention is described mainly for ADSL. However, it may be similarly applicable to VDSL.

BRIEF DESCRIPTION OF THE DRAWINGS

The present invention will be further understood from the following detailed description with reference to the FIGURE in which:

FIGURE illustrates in a functional block diagram an asymmetrical digital subscriber line in accordance with an embodiment of the present invention.

DETAILED DESCRIPTION OF THE PREFERRED EMBODIMENT

Referring to the FIGURE there is illustrated in a functional block diagram an asymmetrical digital subscriber line (ADSL) in accordance with an embodiment of the present invention. The ADSL 10 connects a customer premise equipment (CPE) 11 to a central office (CO) 12. The CPE 11 includes an ADSL modem 14 (ATU-R), POTS splitter 16, a computer 18 and a telephone 20. The CO 12 includes an ADSL modem 22 (ATU-C), a POTS splitter 24, and a telephone switch 26, The ADSL 10 effectively includes the ADSL modems 14 and 22 and the unshielded twisted pair (UTP) 28 there between. The ADSL arrangement of the FIGURE is intended as merely representative and person skilled in the art of DSL would appreciate that POTS splitter 16 can be centralized as shown or distributed throughout the premise and attached to each telephoning device telephone, facsimile, or answering machine. Actual connections would depend on the version of ADSL used for example G-dmt or G-lite. The ADSL modem 14 includes a first circuit 50 for determining and storing on a per bin basis, channel frequency response and noise measurements; a second circuit 52 for determining and storing a signal-to-noise measurement on a per bin basis; a receiver 54 for retrieving the stored frequency response, noise and signal-to-noise measurements from the ADSL modem 22. An analyzer 56 may further be used for analyzing time dependent changes in cross talk levels and line attenuation. The ADSL modem 22 includes a first circuit 58 for determining and storing on a per bin basis, channel frequency response and noise measurements; a second circuit 60 for determining and storing a signal-to-noise measurement on a per bin basis; a receiver 62 for retrieving the stored frequency response, noise and signal-to-noise measurements from the ADSL modem 14. An analyzer 64 may further be used for analyzing time dependent changes in cross talk levels and line attenuation.

In operation, the customer connection via the ADSL 10 includes an initialization stage and a show time stage. The embodiments of the present invention enhance ADSL service maintenance and diagnostics by making diagnostic information available from both ends of the loop during active operation of the service. The combination of complete information on the channel (H(f) and N(f)) during initialization plus show time SNR(f) is provided by the embodiment of the FIGURE. This combination of data allows greater analysis of the line conditions than known methods and reduces interruptions of both the ADSL and POTS service that known methods require.

Embodiments of the present invention allow obtaining of useful information about the channel in which data is being transmitted.

An example of how the present invention could be implemented is now provided for the purposes of illustration. The embedded operations channel (EOC) defined in G.992.1 and G.922.2 are for communication between ATU-C and ATU-R. The EOC supports in-service and out-of-service maintenance and the retrieval of ATU-R status information and performance monitoring parameters (G.992.2, Section 8.1). As the proposed parameters are for maintenance diagnostics and performance monitoring, it is logical to add these parameters in the ATU-R data registers, so they can be retrieved through the EOC.

In G.992.1, registers $9_{16}$ and $F_{16}$ are reserved for future use and in G.992.2, register $A_{16}$ is currently being used. In order to apply the proposed registers to both G.992.1 and G.992.2 consistently, using register $B_{16}$ and $E_{16}$ is proposed.

TABLE 9-3

G.992.1-ATU-R data registers

| Reg. # | Use | Length | Description |
|---|---|---|---|
| $0_{16}$ | Read(R) | 8 bytes (see 9.3.3/ G.994.1) | ATU-R vendor ID |
| $1_{16}$ | R | Vendor discretionary | ATU-R version number minus one |
| $2_{16}$ | R | 32 bytes | ATU-R serial # |
| $3_{16}$ | R | Vendor discretionary | Self test results |
| $4_{16}$ | Read/Write (R/W) | Vendor discretionary | Vendor discretionary |
| $5_{16}$ | R/W | Vendor discretionary | Vendor discretionary |
| $6_{16}$ | R | 1 byte | Line attenuation |
| $7_{16}$ | R | 1 byte | SNR margin |
| $8_{16}$ | R | 30 bytes | ATU-R Configuration$_{(see\ 8.4}$ and Note 1) |
| $9_{16}$ | | | Reserved$_{(Note\ 2)}$ |
| $A_{16}$ | | | Being used in G.992.2 |
| $B_{16}$ | R | 1024 bytes | The normalized channel frequency response $H_R(f)$ at ATU-R |
| $C_{16}$ | R | 2 bytes | The scale factor $HS_R$ of $H_R(f)$ |
| $D_{16}$ | R | 256 bytes | The noise $N_R(f)$ at ATU-R |
| $E_{16}$ | R | 256 bytes | $SNR_R(f)$ at ATU-R |
| $F_{16}$ | Reserved | Reserved | See Note 2 |

NOTE 1-Registers shall be read most significant byte first.
NOTE 2-Registers $9_{16}$ and $F_{16}$ are reserved for future use; ATU-R shall respond UTC (unable to comply) if requested to read from or write to one of these registers.

The in-band frequency channel response, $H_R(f)$, is represented by a normalized complex number a(i) +jb(i) in the linear format, where 1 is the subcarrier index i=0, . . . , 255. Both a(i) and b(i) are coded as a two-byte 2's complement signed fixed point value respectively. The data format of a(i) and b(i) are the same. Bit 15 is a sign bit. The decimal point is on the right of bit 15. The accuracy is 1/32768. In the register, the msb is stored as the left byte and the Isb is stored as the right byte. The value of a(i)+jb(i) must be referred to tip and ring of the copper loop.

The first two bytes in $H_R(f)$ register store the real part (a) of a(i)+jb(i) for bin 0 and the second two bytes store the imaginary part (b) of a(i)+jb(i) for bin 0 and so on. The last four bytes stores the a(i)+jb(i) values for bin 255 for G.922.1 or bin 127 for G.922.2. A value of (−1−j) in a(i)+jb(i) is a special value. It indicates that this bin is either out of the downstream PSD mask or this bin is not used for the data transmission (eg it may be because of the attenuation is too large, so that the SNR is too small or it is the DC subcarrier or the Nyquist subcarrier). The data range is between −32767/32767/32768 inclusive. The register reserves space for all 256 bins, as it is easy for application user to remember.

It is suggested that the reported channel frequency response values be partitioned between the scale factor and per carrier complex components such that $\max(|a(i)|, |b(i)|)$ over all i is equal to 32767/32768 in order to maximize precision.

The $H_R(f)$ register is only updated during the ADSL initialization stage. This information can be retrieved during show time, however, it may not be updated during show time.

The scale factor $HS_R$ is coded as two bytes 2's complement unsigned fixed point value. The decimal point is on the right of bit 15. One bit is used for integer and 15 bits are used for the fraction. The accuracy is 1/32768. In the register, the msb is stored as the left byte and the 1 sb is stored as the right byte. The data range is between 0 and +(1+32767/32768) inclusive. There is no special value for it.

This data range supports a dynamic range of approximately +6dB to −90dB. The portion of the scale factor range above zero is necessary to accommodate the possibility that on short loops, given manufacturing variations in signal path gains and filter responses, it is possible that the channel may appear to have gain rather than loss.

The $HS_R$ scale factor register is only updated during the ADSL initialization stage. This information can be retrieved during show time, however, it may not be updated during show time.

The conversion of the normalized value of a or b to the absolute value can be obtained by multiplying a or b by $HS_R$.

The in-band noise, $N_R(f)$, is coded as a one-byte unsigned integer. The unit is in dBm/Hz. The accuracy is 1 dBm/Hz. Since the noise in dBm/Hz is a negative value, a value of 95 means−95dBm/Hz. The noise values must be referred to the tip-ring of the copper loop.

The first byte in $N_R(f)$ register stores the value for bin 0 and the second byte stores the value for bin 1 and so on. The last byte stores the value for bin 255 for G.922.1 or bin 127 for G.992.2. A value of 255 is a special value. It indicates that this bin is either out of the downstream PSD mask or this bin is not used for the data transmission (e.g. It is the DC subcarrier or the Nyquist subcarrier). The data range is between 0 and 254 inclusive, where the highest value 255 is reserved as the special value.

The $N_R(f)$ register is only updated during the ADSL initialization stage. This information can be retrieved during show time, however, it may not be updated during show time.

The in band $SNR_R(f)$ is a one-byte unsigned integer. The unit is in dB. The accuracy is 0.5dB. For example, a value of 00000001 represents 0.5dB and a value of 01000001 is 64.5dB.

The first byte in the $SNR_R(f)$ register stores the SNR value for bin 0 and the second byte stores the $SNR_R(f)$ value for bin 1 and so on. The last byte stores the $SNR_R(f)$ value for bin 255 for G.922.1 or bin 127 for G.922.2. A value of 127.5 is a special value. It indicates that this bin is either out of the downstream PSD mask or it is not used for the data transmission (e.g. it is the DC subcarrier or the Nyquist subcarrier). The data range is from 0 to 127 dB inclusive, where the highest value 127.5 is reserved as the special value.

The $SNR_R(f)$ register is updated during the ADSL show time. It is updated as changes occur.

The upstream channel frequency response $H_C(f)$, the scale factor $HS_C$, the noise $N_C(f)$ and the signal to noise ratio $SNR_C(f)$ are available in the ARU-C. Currently, no programming interface is available at the chipset level to allow for diagnostics purposes of the ADSL service. The data definitions and their formats should be the same as the ones proposed for the downstream direction in this contribution.

With the existing information available from ITU G.992.1 and G.992.2 as well as from embodiments of the present invention, the ADSL maintenance and diagnostic capabilities can be enhanced.

The retrieved information, in at least one embodiment, can be used for remotely analyzing the physical copper loop condition between tip and ring. That is for:
analyzing the crosstalk at both ATU-C and ATU-R, i.e. analyzing time dependent changes in crosstalk levels and line attenuation (such as due to moisture);
trouble shooting why the data rate cannot reach the maximum data rate of a given loop.

The above capabilities would otherwise require a truck roll plus the use external test equipment.

The disclosed embodiments propose a new way to collect information available in the ADSL modems, such that this information can be used for enhancing the ADSL services maintenance and diagnostics. For the information required from ATU-R, the embodiments of the present invention save the information (per bin frequency channel response, per bin signal to noise ratio and per bin noise) in the ATU-R register. The information saved in the register is the frequency channel response and noise information as measured during the modem initialization. This information is reflected back to the tip and ring of the copper pair. The signal to noise ratio information is the show time information. A further embodiment also provides the provision of the programming interface to allow for retrieval of the same information on the ATU-C side.

What is claimed is:

1. A method of retrieving channel characteristics of a Digital Subscriber Line (DSL) channel having a plurality of bins, comprising the steps of:
determining, at tip and ring terminals of a modem input port, and storing in data registers on a per bin basis a channel frequency response measurement and a noise measurement measured at initialization at a first end of the DSL channel without an effect of a filter or an automatic pain controller;
determining and storing in data registers on a per bin basis a signal-to-noise measurement measured at show time at the first end of the DSL channel without the effect of the filter or the automatic gain controller; and
transmitting the channel frequency response measurement, the noise measurement and the signal-to-noise measurement from the first end to a second end of the DSL channel.

2. A method as claimed in claim 1 wherein the first end is a central office (CO) end, and the second end is a customer premise equipment (CPE) end.

3. A method as claimed in claim 1 wherein the DSL channel is asymmetrical.

4. A method as claimed in claim 1 wherein the first end is a customer premise equipment (CPE) end, and the second end is a central office (CO) end.

5. A method as claimed in claim 1 wherein the DSL channel is non-overlapping.

6. A method as claimed in claim 1 wherein the DSL channel is an Asymmetric Digital Subscriber Line (ADSL) channel.

7. A method as claimed in claim 1 wherein the DSL channel is a very high bit-rate DSL (VDSL) channel.

8. The method as claimed in claim 1, wherein the DSL channel frequency response, $H_R(f)$ is represented by a normalized complex number $a(i)+jb(i)$.

9. The method as claimed in claim 1, further comprising the step of analyzing time dependent changes in cross talk levels and line attenuation at the second end of the DSL channel.

10. A method as claimed in claim 1 wherein the DSL channel is overlapping.

11. A method as claimed in claim 1 wherein the channel is symmetrical.

12. A method as claimed in claim 1 wherein the channel is overlapping.

13. An apparatus for retrieving channel characteristics of a Digital Subscriber Line (DSL) channel having a plurality of bins, the apparatus comprising:
  a first circuit for determining at tip and ring terminals of a modem input port, and storing in data registers on a per bin basis a channel frequency response measurement and a noise measurement measured at a first end of the DSL channel without an effect of a filter or an automatic gain controller;
  a second circuit for determining and storing in data registers on a per bin basis a signal-to-noise measurement measured at the first end without the effect of the filter or the automatic gain controller; and
  a transmitter for transmitting the frequency response measurement, the noise measurement and the signal-to-noise measurement from the first end to a second end of the DSL channel.

14. An apparatus as claimed in claim 13 wherein the first end is a central office (CO) end, and the second end is a customer premise equipment (CPE) end.

15. An apparatus as claimed in claim 13 wherein the DSL channel is asymmetrical.

16. An apparatus as claimed in claim 13 wherein the first end is a customer premise equipment (CPE) end, and the second end is a central office (CO) end.

17. An apparatus as claimed in claim 13 wherein the DSL channel is non-overlapping.

18. An apparatus as claimed in claim 13 wherein the DSL channel is an Asymmetric Digital Subscriber Line (ADSL) channel.

19. An apparatus as claimed in claim 13 wherein the DSL channel is a very high bit-rate DSL (VDSL) channel.

20. The apparatus as claimed in claim 13, wherein the channel frequency response, $H_R(f)$ is represented by a normalized complex number $a(i)+jb(i)$.

21. The apparatus as claimed in claim 13, further comprising an analyzer at the second end for analyzing time dependent changes in cross talk levels and line attenuation.

22. An apparatus as claimed in claim 13 wherein the DSL channel is symmetrical.

23. An apparatus as claimed in claim 13 wherein the DSL channel is overlapping.

24. An apparatus as claimed in claim 13 wherein the channel is symmetrical.

25. An apparatus as claimed in claim 13 wherein the channel is overlapping.

26. A method of retrieving channel characteristics of a Digital Subscriber Line (DSL) channel having a plurality of bins, comprising the steps of:
  determining at tip and ring terminals of a modem input port, and storing in data registers on a per bin basis channel a frequency response measurement and a noise measurement measured at a first end of the DSL channel without the effect of the filter or the automatic gain controller;
  determining and storing in data registers on a per bin basis a signal-to-noise measurement measured at the first end of the DSL channel without an effect of a filter or an automatic gain controller; and
  transmitting the channel frequency response measurement, the noise measurement and the signal-to-noise measurement from the first end to a second end of the DSL channel.

* * * * *

UNITED STATES PATENT AND TRADEMARK OFFICE
CERTIFICATE OF CORRECTION

PATENT NO. : 7,564,895 B2  Page 1 of 1
APPLICATION NO. : 10/024020
DATED : July 21, 2009
INVENTOR(S) : Gin Liu et al.

It is certified that error appears in the above-identified patent and that said Letters Patent is hereby corrected as shown below:

Column 6
line 41, change "pain" to --gain--.

Signed and Sealed this

Twenty-seventh Day of April, 2010

David J. Kappos
*Director of the United States Patent and Trademark Office*